US012618337B1

(12) United States Patent
Clark et al.

(10) Patent No.: US 12,618,337 B1
(45) Date of Patent: May 5, 2026

(54) AIRCRAFT POWERPLANT WITH VENTILATED CABLE CONDUIT

(71) Applicant: RTX Corporation, Farmington, CT (US)

(72) Inventors: Thomas E. Clark, Wells, ME (US); Murat Yazici, Glastonbury, CT (US); Jung Muk Choe, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/067,322

(22) Filed: Feb. 28, 2025

(51) Int. Cl.
 *F01D 25/12* (2006.01)
 *B64D 31/18* (2024.01)
 *F02C 6/00* (2006.01)

(52) U.S. Cl.
 CPC ............. *F01D 25/12* (2013.01); *B64D 31/18* (2024.01); *F02C 6/00* (2013.01); *F05D 2220/323* (2013.01); *F05D 2260/232* (2013.01)

(58) Field of Classification Search
 CPC ......... F05D 2220/323; F05D 2260/232; F05D 2260/20; F02C 6/00; F02C 7/12; B64D 31/18; F01D 25/12; F01D 25/24; F01D 15/10
 See application file for complete search history.

(56) References Cited

U.S. PATENT DOCUMENTS

| | | | |
|---|---|---|---|
| 8,300,412 B2 | 10/2012 | Pal | |
| 12,004,334 B2 | 6/2024 | Pal | |
| 2019/0145316 A1 | 5/2019 | Schwarz | |
| 2020/0271061 A1* | 8/2020 | Kopeschka | ............. F02D 45/00 |
| 2022/0045573 A1* | 2/2022 | Seki | ........................... F02C 7/18 |
| 2022/0056810 A1* | 2/2022 | Grunwald | ............... F01D 15/10 |
| 2022/0056846 A1* | 2/2022 | Pazinski | ................. F01D 25/12 |
| 2022/0255401 A1* | 8/2022 | Czarnik | ................. H02K 7/003 |
| 2023/0041836 A1 | 2/2023 | Pal | |
| 2025/0101909 A1* | 3/2025 | Freer | ....................... F01D 15/10 |

FOREIGN PATENT DOCUMENTS

| | | |
|---|---|---|
| FR | 2995497 B1 | 6/2016 |
| WO | 2024023316 A1 | 2/2024 |

* cited by examiner

*Primary Examiner* — Rodolphe Andre Chabreyrie
(74) *Attorney, Agent, or Firm* — Getz Balich LLC

(57) ABSTRACT

An assembly is provided for an aircraft powerplant. This assembly includes an electric machine, an electric machine controller, an electric cable, a conduit and an air circuit. The electric machine controller is configured to control operation of the electric machine. The electric cable electrically couples the electric machine controller to the electric machine. The conduit extends longitudinally from a first end of the conduit to a second end of the conduit. The electric cable extends longitudinally through a bore of the conduit. The air circuit is configured to cool the electric cable within the conduit using a flow of air. The air circuit includes the bore of the conduit.

19 Claims, 9 Drawing Sheets

AIRCRAFT POWERPLANT WITH VENTILATED CABLE CONDUIT

BACKGROUND OF THE DISCLOSURE

1. Technical Field

This disclosure relates generally to an aircraft and, more particularly, to an air system for a powerplant of the aircraft.

2. Background Information

An aircraft powerplant includes various components which utilize air cooling during aircraft powerplant operation. Various air cooling systems and methods are known in the art. While these known air cooling systems and methods have various benefits, there is still room in the art for improvement.

SUMMARY OF THE DISCLOSURE

According to an aspect of the present disclosure, an assembly is provided for an aircraft powerplant. This assembly includes an electric machine, an electric machine controller, an electric cable, a conduit and an air circuit. The electric machine controller is configured to control operation of the electric machine. The electric cable electrically couples the electric machine controller to the electric machine. The conduit extends longitudinally from a first end of the conduit to a second end of the conduit. The electric cable extends longitudinally through a bore of the conduit. The air circuit is configured to cool the electric cable within the conduit using a flow of air. The air circuit includes the bore of the conduit.

According to another aspect of the present disclosure, another assembly is provided for an aircraft powerplant. This assembly includes an electric device, an electric cable, a conduit and an air circuit. The electric device is configured as or otherwise includes an electric machine or an electric controller. The electric cable is electrically coupled to the electric device. The conduit extends longitudinally from a first end of the conduit to a second end of the conduit. The electric cable extends longitudinally through a bore of the conduit to the electric device. The air circuit includes the bore of the conduit. The air circuit is configured to selectively direct air received from a first air source and/or a second air source into the bore of the conduit to cool the electric cable within the conduit.

According to still another aspect of the present disclosure, another assembly is provided for an aircraft powerplant. This assembly includes a conduit, a plurality of electric cables, a bulkhead and an air circuit. The conduit extends longitudinally from a first end of the conduit to a second end of the conduit. The electric cables extend longitudinally through a bore of the conduit. The bulkhead is disposed within the bore of the conduit and extends laterally across the bore of the conduit. The bulkhead includes a plurality of cable apertures and a plurality of airflow apertures. Each of the electric cables is seated in and extends longitudinally through a respective one of the cable apertures. Each of the airflow apertures fluidly couples a first section of the bore of the conduit to a first side of the bulkhead to a second section of the bore of the conduit to a second side of the bulkhead. The air circuit is configured to cool the electric cables within the conduit using a flow of air. The air circuit includes the bore of the conduit.

The assembly may also include a first air source. The air circuit may be configured to direct the flow of air from the first air source into the bore of the conduit.

The assembly may also include a compressor section, a combustor section, a turbine section and a core flowpath. The combustor section may include a combustor. The core flowpath may extend through the compressor section, the combustor section and the turbine section. The first air source may include the core flowpath. An inlet into the air circuit may be disposed along the core flowpath upstream of the combustor.

The inlet into the air circuit may be disposed along the core flowpath in the compressor section.

The air circuit may also include a flow regulator between the core flowpath and the bore of the conduit.

The assembly may include a compressor section, a combustor section, a turbine section and a bypass flowpath. The combustor section may include a combustor. The bypass flowpath may bypass the compressor section, the combustor section and the turbine section. The first air source may include the bypass flowpath. The inlet into the air circuit may be disposed along the bypass flowpath.

The air circuit may also include a flow regulator between the bypass flowpath and the bore of the conduit.

The assembly may also include a second air source. The air circuit may be configured to direct the flow of air from the first air source into the bore of the conduit during a first mode. The air circuit may be configured to direct the flow of air from the second air source into the bore of the conduit during a second mode.

The assembly may also include a first air source, a second air source and a flow regulator. The flow regulator may be configured to direct the flow of air from at least (or only) the first air source into the bore of the conduit during a first mode. The flow regulator may be configured to direct the flow of air from at least (or only) the second air source into the bore of the conduit during a second mode.

The assembly may also include a support structure disposed within the bore of the conduit. The support structure may support the electric cable within the bore of the conduit.

The assembly may also include a bulkhead disposed within and extend laterally across the bore of the conduit. The bulkhead may include a cable aperture and an airflow port. The cable aperture and the airflow port may each project longitudinally through the bulkhead. The electric cable may be seated in the cable aperture.

The airflow port may be next to the cable aperture. A distance between the cable aperture and the airflow port may be between twenty percent and one hundred percent of a width of the cable aperture.

The assembly may also include a second electric cable extending longitudinally through the bore of the conduit. The second electric cable may be laterally spaced from the electric cable by an air gap within the bore of the conduit. A distance between the second electric cable and the electric cable across the air gap may be between twenty percent and two hundred percent of a width of the electric cable.

The assembly may also include a second electric cable extending longitudinally through the bore of the conduit. The second electric cable may also electrically couple the electric machine controller to the electric machine.

The assembly may also include a second electric machine, a second electric machine controller and a second electric cable. The second electric machine controller may be configured to control operation of the second electric machine. The second electric cable may electrically couple the second electric machine controller to the second electric machine. The second electric cable may extend longitudinally through the bore of the conduit.

The electric machine may be configurable as an electric motor and/or an electric generator.

The assembly may also include a rotating structure comprising a bladed rotor. The electric machine may be operatively coupled to the rotating structure.

The first end of the conduit may be disposed next to the electric machine.

The second end of the conduit may be disposed next to the electric machine controller.

The assembly may also include an inner case and an outer case. The electric machine may be mounted with the inner case. The outer case may be spaced radially outboard from and extend circumferentially about the inner case. The electric machine controller may be mounted with the outer case.

The assembly may also include a vane structure. The conduit may extend through an interior of the vane structure.

The assembly may also include an engine case extending axially along and circumferentially about an axis. At least a longitudinal section of the conduit may extend axially along the engine case.

The assembly may also include an engine case extending axially along and circumferentially about an axis. At least a longitudinal section of the conduit may extend circumferentially along the engine case.

The assembly may also include a housing structure comprising an internal compartment. The electric machine controller may be disposed within the internal compartment. The air circuit may be configured to direct the flow of air out of the conduit into the internal compartment.

The assembly may also include a compressor section, a combustor section, a turbine section and a bypass flowpath. The combustor section may include a combustor. The bypass flowpath may bypass the compressor section, the combustor section and the turbine section. The air circuit may be configured to direct the flow of air out of the conduit into the bypass flowpath.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
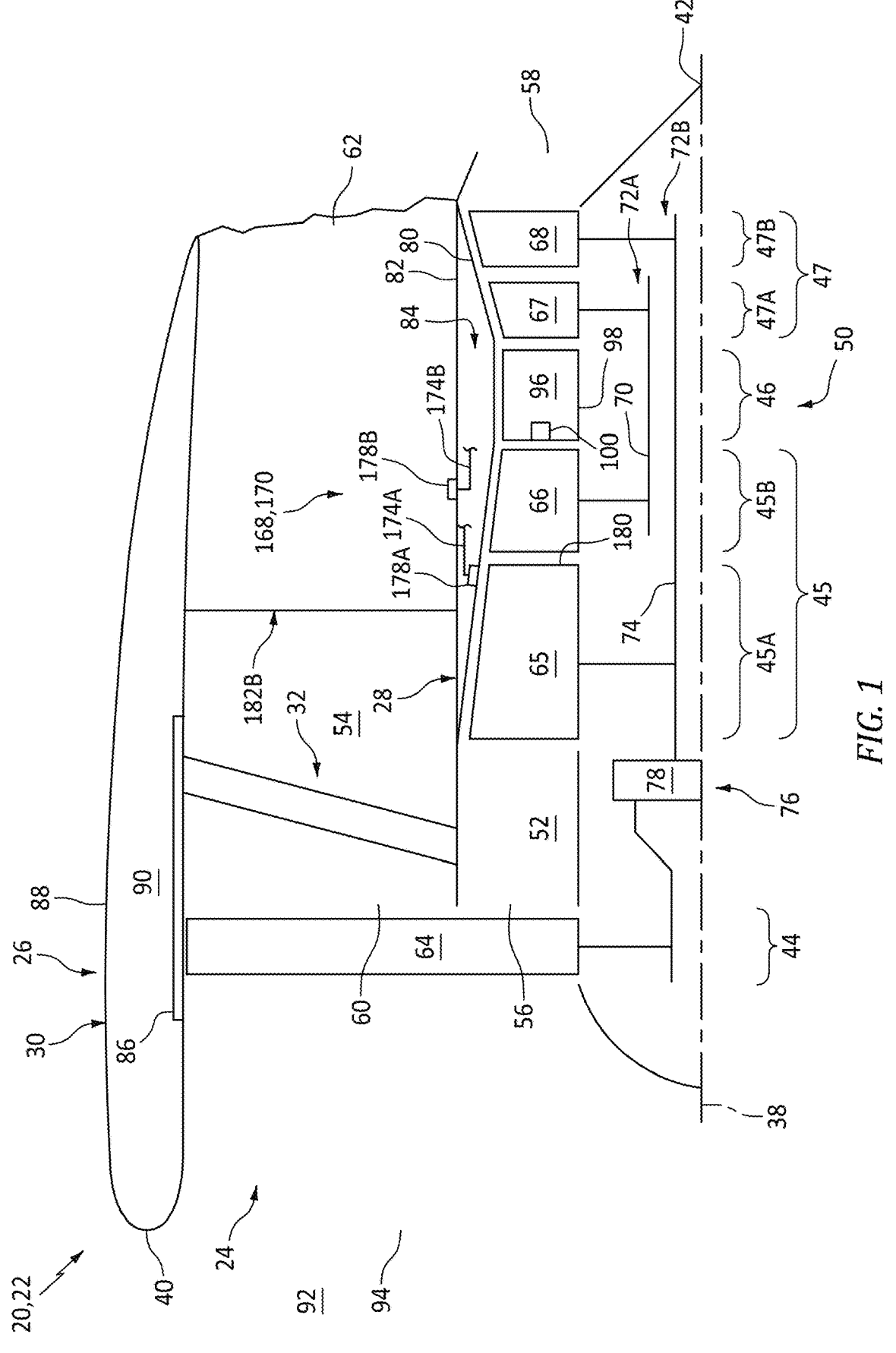
FIG. 1 is a partial schematic illustration of an aircraft propulsion system with a ducted propulsor rotor.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary propulsion system. The aircraft propulsion system 22, for example, may alternatively be configured as a turbojet propulsion system, a turboprop propulsion system, a turboshaft propulsion system, a propfan propulsion system, a pusher fan propulsion system, or any other type of ducted and/or open rotor propulsion system. Moreover, the aircraft powerplant 20 is not limited to propulsion system applications. The aircraft powerplant 20, for example, may also (or alternatively) be configured as an electrical power system for the aircraft; e.g., an auxiliary power unit (APU).

The aircraft propulsion system 22 includes a gas turbine engine 24 (e.g., a turbofan engine) housed within a stationary propulsion system housing 26, which propulsion system housing 26 of FIG. 1 includes an inner housing structure 28, an outer housing structure 30 and a guide vane structure 32 (e.g., a fan exit guide vane (FEGV) structure) extending radially between and connected to the inner housing structure 28 and the outer housing structure 30. The aircraft propulsion system 22 also includes an electric machine system 34 (see FIG. 2) and an air system 36 (see FIG. 3). The aircraft propulsion system 22 extends axially along an axis 38 between an axial upstream, forward end 40 of the aircraft propulsion system 22 and an axial downstream, aft end 42 of the aircraft propulsion system 22. Briefly, the propulsion system axis 38 may be a centerline axis of the aircraft propulsion system 22, the turbine engine 24 and/or one or more of its members. The propulsion system axis 38 may also or alternatively be a rotational axis for one or more members of the turbine engine 24.

The aircraft propulsion system 22 and its turbine engine 24 of FIG. 1 include a propulsor section 44 (e.g., a fan section), a compressor section 45, a combustor section 46 and a turbine section 47. The compressor section 45 of FIG. 1 includes a low pressure compressor (LPC) section 45A and a high pressure compressor (HPC) section 45B. The turbine section 47 of FIG. 1 includes a high pressure turbine (HPT) section 47A and a low pressure turbine (LPT) section 47B. At least (or only) the LPC section 45A, the HPC section 45B, the combustor section 46, the HPT section 47A and the LPT section 47B collectively form a core 50 (e.g., a gas generator) of the turbine engine 24. The aircraft propulsion system 22 and its turbine engine 24 of FIG. 1 also include a core flowpath 52 (e.g., an annular core flowpath) and a bypass flowpath 54 (e.g., an annular bypass flowpath). The core flowpath 52 extends sequentially through the LPC section 45A, the HPC section 45B, the combustor section 46, the HPT section 47A and the LPT section 47B from an airflow inlet 56 into the core flowpath 52 to a combustion products exhaust 58 out from the core flowpath 52. The bypass flowpath 54 extends through a bypass duct from an airflow inlet 60 into the bypass flowpath 54 to an airflow exhaust 62 from the bypass flowpath 54, where the bypass duct may be formed by the inner housing structure 28 and the outer housing structure 30. The bypass flowpath 54 and its bypass duct are configured to bypass (e.g., are disposed radially outboard of and extend along) the engine core 50 and the inner housing structure 28.

The propulsor section 44, the LPC section 45A, the HPC section 45B, the combustor section 46, the HPT section 47A and the LPT section 47B may be arranged sequentially along the propulsion system axis 38 within the propulsion system housing 26. The propulsor section 44 includes a bladed propulsor rotor 64; e.g., a fan rotor. The LPC section 45A includes a bladed low pressure compressor (LPC) rotor 65. The HPC section 45B includes a bladed high pressure compressor (HPC) rotor 66. The HPT section 47A includes a bladed high pressure turbine (HPT) rotor 67. The LPT section 47B includes a bladed low pressure turbine (LPT) rotor 68. Each of these engine rotors 64-68 includes a rotor base (e.g., a disk or a hub) and a plurality of rotor blades (e.g., airfoils, vanes, etc.). The rotor blades may be arranged into one or more stages axially along the respective engine rotor 64-68. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 66 is coupled to and rotatable with the HPT rotor 67. The HPC rotor 66 of FIG. 1, for example, is connected to the HPT rotor 67 through a high speed shaft 70. At least (or only) the HPC rotor 66, the HPT rotor 67 and the high speed shaft 70 collectively form a high speed rotating structure 72A; e.g., a high speed spool of the turbine engine 24 and its engine core 50. This high speed rotating structure 72A of FIG. 1 and its members 66, 67 and 70 are rotatable about the propulsion system axis 38. However, it is contemplated the high speed rotating structure 72A may alternatively be rotatable about another axis radially and/or angularly offset from the rotational axis of the propulsor rotor 64 and/or the centerline axis of the turbine engine 24.

The LPC rotor 65 is coupled to and rotatable with the LPT rotor 68. The LPC rotor 65 of FIG. 1, for example, is connected to the LPT rotor 68 through a low speed shaft 74. At least (or only) the LPC rotor 65, the LPT rotor 68 and the low speed shaft 74 collectively form a low speed rotating structure 72B; e.g., a low speed spool of the turbine engine 24 and its engine core 50. This low speed rotating structure 72B of FIG. 1 and its members 65, 68 and 74 are rotatable about the propulsion system axis 38. However, it is contemplated the low speed rotating structure 72B may alternatively be rotatable about another axis radially and/or angularly offset from the rotational axis of the propulsor rotor 64 and/or the centerline axis of the turbine engine 24.

The low speed rotating structure 72B is coupled to the propulsor rotor 64 through a propulsor drivetrain 76. The propulsor drivetrain 76 may be configured as a geared drivetrain, where a geartrain 78 (e.g., a transmission, a speed change device, an epicyclic geartrain, etc.) is disposed between and operatively couples the propulsor rotor 64 to the low speed rotating structure 72B and its LPT rotor 68. With this arrangement, the propulsor rotor 64 may rotate at a different (e.g., slower) rotational speed than the low speed rotating structure 72B and its LPT rotor 68. Here, the propulsor rotor 64 and the low speed rotating structure 72B may rotate in a common (the same) direction about the propulsion system axis 38 or in opposite directions about the propulsion system axis 38 depending, for example, upon the specific configuration of the geartrain 78. Alternatively, the propulsor drivetrain 76 may be configured as a direct-drive drivetrain, where the geartrain 78 is omitted. With such an arrangement, the propulsor rotor 64 rotates at a common (the same) rotational speed as the low speed rotating structure 72B and its LPT rotor 68.

The inner housing structure 28 of FIG. 1 includes an inner case 80 (e.g., a core case) for the turbine engine 24, an inner nacelle structure 82 (sometimes referred to as an inner fixed structure (IFS)) and an internal inner housing compartment 84 (e.g., an engine core compartment). The inner case 80 is disposed radially outboard of, extends axially along and may circumscribe one or more or all of the engine sections 45A-47B and the engine rotors 65-68. The inner case 80 may thereby house and provide a support structure for the respective engine sections 45A-47B and the engine rotors 65-68. The inner nacelle structure 82 is configured to provide an aerodynamic cover over the engine core 50 and its inner case 80. At least (or only) the inner housing structure 28 and its inner nacelle structure 82 may collectively form a radial inner peripheral boundary of the bypass flowpath 54. The inner housing compartment 84 of FIG. 1 is formed by and is disposed radially between the inner case 80 and an inner barrel of the inner nacelle structure 82.

The outer housing structure 30 of FIG. 1 includes an outer case 86 (e.g., a fan case) for the turbine engine 24, an outer nacelle structure 88 and an internal outer housing compartment 90. The outer case 86 is disposed radially outboard of, extends axially along and may circumscribe the propulsor section 44 and its propulsor rotor 64. The outer case 86 may thereby house and may be configured as a containment structure for the propulsor section 44 and its propulsor rotor 64. The outer nacelle structure 88 is configured to provide an aerodynamic cover over the outer case 86. At least (or only) the outer housing structure 30 and its outer nacelle structure 88 may collectively form a radial outer peripheral boundary of the bypass flowpath 54. The outer housing compartment 90 of FIG. 1 is formed by and is disposed radially between the outer case 86 and the outer nacelle structure 88; e.g., outer cowls of the outer nacelle structure 88.

During operation of the aircraft propulsion system 22 of FIG. 1, ambient air from an environment 92 external to the aircraft and its aircraft propulsion system 22 enters the aircraft propulsion system 22 and its turbine engine 24 through an airflow inlet 94. This air is propelled by the rotating propulsor rotor 64 in a downstream, aft direction towards the propulsion system aft end 42.

An outer stream of the air propelled by the rotating propulsor rotor 64 is directed into the bypass flowpath 54 through its bypass inlet 60, which air entering the bypass flowpath 54 may be referred to as "bypass air". The guide vane structure 32 conditions (e.g., straightens out, de-swirls, etc.) the flow of the bypass air within the bypass duct. This conditioned bypass air is subsequently directed out of the aircraft propulsion system 22 through the bypass exhaust 62 to provide forward thrust. The propulsion of the bypass air may account for a majority of the forward thrust generated by the aircraft propulsion system 22 and its turbine engine 24 of FIG. 1.

An inner stream of the air propelled by the rotating propulsor rotor 64 is directed into the core flowpath 52 through its core inlet 56, which air entering the core flowpath 52 may be referred to as "core air". This core air is compressed by the LPC rotor 65 and the HPC rotor 66 and is directed into a combustion chamber 96 (e.g., annular combustion chamber) of a combustor 98 (e.g., annular combustor) in the combustor section 46. Fuel is injected into the combustion chamber 96 by one or more fuel injectors 100 and mixed with the compressed core air to provide a fuel-air mixture. This fuel-air mixture is ignited and combustion products thereof flow through and sequentially drive rotation of the HPT rotor 67 and the LPT rotor 68. The rotation of the HPT rotor 67 and the LPT rotor 68 respectively drive rotation of the HPC rotor 66 and the LPC rotor 65 and, thus, compression of the air received from the core inlet 56. The rotation of the LPT rotor 68 also drives rotation of the propulsor rotor 64 through the propulsor drivetrain 76.

Figure 2:
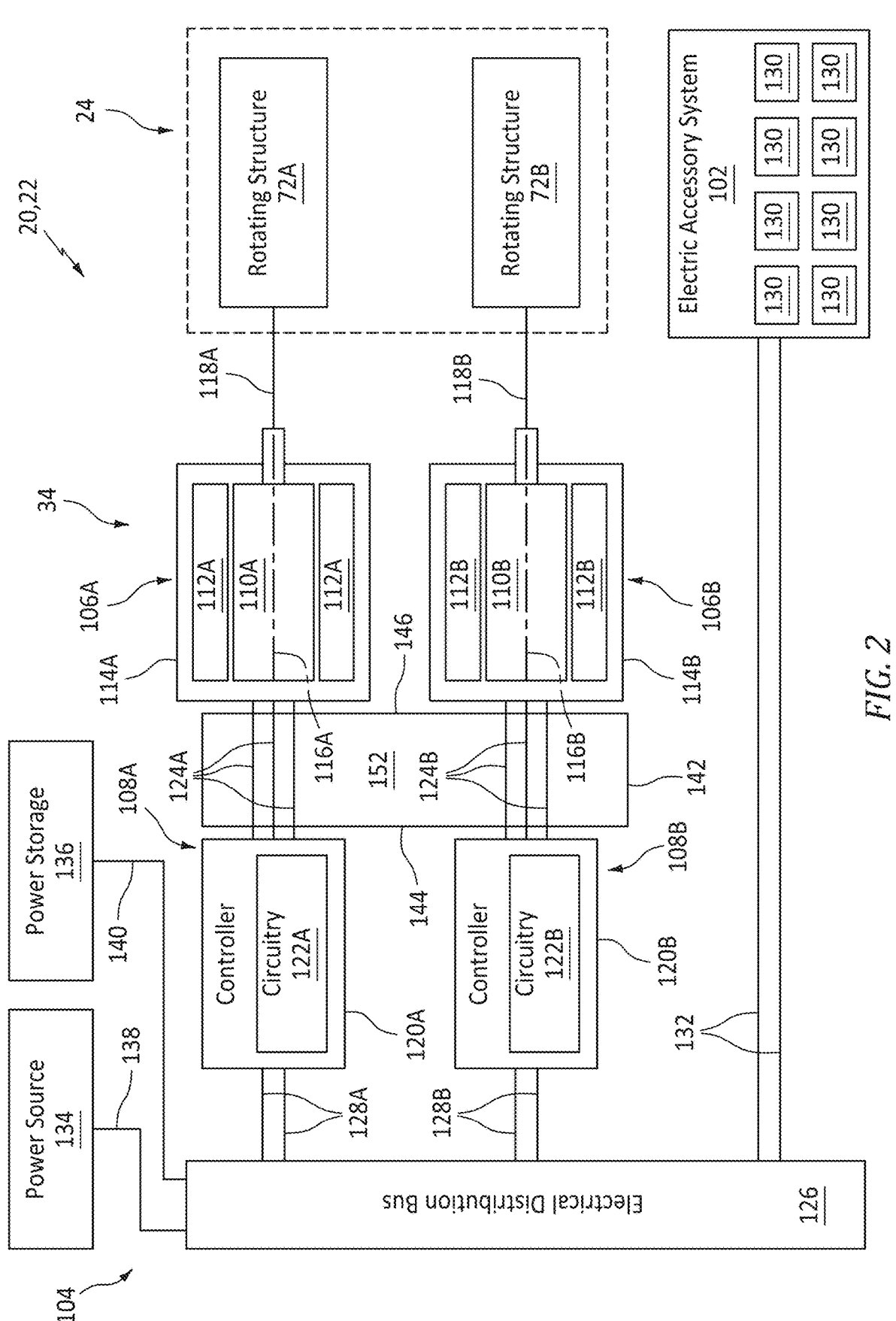
FIG. 2 is a schematic illustration of a portion of the aircraft propulsion system at an electric machine system.

Referring to FIG. 2, the electric machine system 34 is electrically coupled to an optional electric accessory system 102 and an electrical system 104 for the aircraft and its aircraft propulsion system 22. The electric machine system 34 of FIG. 2 includes one or more electric machines 106A and 106B (generally referred to as "106") and one or more electric machine (EM) controllers 108A and 108B (generally referred to as "108"). For ease of description, each electric machine 106 of FIG. 2 is described below as being electrically coupled to, controlled by and/or otherwise associated with a single, dedicated EM controller 108. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with the single electric machine.

Each electric machine 106A, 106B of FIG. 2 includes an electric machine rotor 110A, 110B (generally referred to as "110"), an electric machine stator 112A, 112B (generally referred to as "112") and an electric machine housing 114A, 114B (generally referred to as "114"); e.g., a case. The machine rotor 110A, 110B is rotatable about a rotational axis 116A, 116B (generally referred to as "116") of the respective machine rotor 110A, 110B, which electric machine (EM) axis 116 may also be a centerline axis of the respective electric machine 106. The machine stator 112 of FIG. 2 is radially outboard of and circumscribes the machine rotor 110. With this arrangement, each electric machine 106 is configured as a radial flux electric machine. The electric machines 106 of the present disclosure, however, are not limited to such an exemplary rotor-stator configuration nor to radial flux arrangements. The machine rotor 110, for example, may alternatively be radially outboard of and circumscribe the machine stator 112. In another example, the machine rotor 110 may be axially next to the machine stator 112 configuring the electric machine 106 as an axial flux electric machine. Referring again to FIG. 2, the machine rotor 110 and the machine stator 112 are at least partially or completely housed within an interior of the machine housing 114.

Each electric machine 106A, 106B may be operatively coupled to a respective one of the engine rotating structures 72A, 72B (generally referred to as "72"). Each machine rotor 110A, 110B of FIG. 2, for example, is mechanically coupled to and rotatable with the respective engine rotating structure 72A, 72B through an engine-electric machine drivetrain 118A, 118B (generally referred to as "118"). This engine-electric machine drivetrain 118 may be configured as or otherwise include a shaft, a tower shaft assembly, an accessory gearbox, an angle gearbox, and/or the like. For ease of description, each machine rotor 110 of FIG. 2 is described below as being coupled to and rotatable with a unique one of the engine rotating structures 72 of the turbine engine 24. However, it is contemplated multiple machine rotors may alternatively be coupled to and rotatable with a common engine rotating structure; e.g., 72A or 72B. It is also contemplated a single one of the machine rotors may be coupled to and rotatable with multiple engine rotating structures, directly or through another device such as a differential or a clutch system. In addition, while the electric machines 106 are described above as being coupled to the engine rotating structures 72, it is contemplated the machine rotor 110 of one or more of the electric machines 106 may also or alternatively be operatively coupled to another rotating device through the engine-electric machine drivetrain 118 such as, but not limited to, a pump rotor, an auxiliary compressor rotor, an actuator rotor, or the like.

Each electric machine 106 of FIG. 2 may be configurable as an electric motor and/or an electric generator; e.g., an electric motor-generator. For example, during a respective motor mode of operation, each electric machine 106 may operate as the electric motor to convert electricity received from the aircraft electrical system 104 into mechanical power. The machine stator 112, for example, may generate an electromagnetic field with the machine rotor 110 using a current of electricity received from the aircraft electrical system 104 through the respective EM controller 108. This electromagnetic field may drive rotation of the machine rotor 110. The machine rotor 110, in turn, may provide mechanical power to and drive rotation of the respective engine rotating structure 72 through the respective engine-electric machine drivetrain 118. This mechanical power may be provided to boost power or completely power the rotation of the respective engine rotating structure 72. By contrast, during a respective generator mode of operation, each electric machine 106 may operate as the electric generator to convert mechanical power received from the respective engine rotating structure 72 into electricity. Rotation of the machine rotor 110, for example, may be rotationally driven by rotation of the respective engine rotating structure 72 through the engine-electric machine drivetrain 118. The rotation of the machine rotor 110 may generate an electromagnetic field with the machine stator 112, and the machine stator 112 may convert energy from the electromagnetic field into electricity. The electric machine 106 may then provide a current of electricity to the aircraft electrical system 104 through the respective EM controller 108 for storage and/or further use. The electric machines 106 of the present disclosure, however, are not limited to such exemplary operation. For example, one or more of the electric machines 106 may each alternatively be configured as a dedicated electric generator; e.g., without the electric motor functionality. In another example, one or more of the electric machines 106 may each alternatively be configured as a dedicated electric motor; e.g., without the electric generator functionality.

Each EM controller 108A, 108B includes a controller housing 120A, 120B (generally referred to as "120") and internal controller circuitry 122A, 122B (generally referred to as "122"). The controller housing 120 may be configured as an enclosed case (e.g., a closed or sealed container) for the respective controller circuitry 122. The controller circuitry 122 is disposed within an interior of the respective controller housing 120; e.g., an internal chamber or other volume(s) within and enclosed by the controller housing 120. The controller circuitry 122 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer(s), electrical rectifier(s), and/or the like.

Each EM controller 108A, 108B is electrically coupled to the respective electric machine 106A, 106B through one or more electric cables 124A, 124B (generally referred to as "124"); e.g., high voltage electric cables, power feeder cables, etc. More particularly, the controller circuitry 122 of each EM controller 108 is electrically coupled to the respective electric machine 106 and its machine stator 112 through the respective electric cables 124. Similarly, each EM controller 108A, 108B is electrically coupled to an electrical distribution bus 126 of the aircraft electrical system 104 through one or more electric cables 128A, 128B (generally referred to as "128"); e.g., high voltage electric cables, power feeder cables, etc. More particularly, the controller circuitry 122 of each EM controller 108 is electrically coupled to the aircraft electrical system 104 and its electrical distribution bus 126 through the respective electric cables 128.

Each EM controller 108 and its controller circuitry 122 are configured to control operation of the respective electric machine 106. For example, when operating as the electric motor, each EM controller 108 and its controller circuitry 122 are configured to regulate a flow of electricity from the aircraft electrical system 104 to the respective electric machine 106. This electricity flow regulation may include: (a) turning-on the flow of electricity from the aircraft electrical system 104 to the respective electric machine 106 (e.g., electrically coupling the respective electric machine 106 to the aircraft electrical system 104); (b) turning-off the flow of electricity from the aircraft electrical system 104 to the respective electric machine 106 (e.g., electrically decoupling the respective electric machine 106 from the aircraft electrical system 104); (c) moderating the flow of electricity from the aircraft electrical system 104 to the respective electric machine 106. Here, each EM controller 108 operates as a motor controller. In another example, when operating as the electric generator, each EM controller 108 and its controller circuitry 122 are configured to regulate a flow of electricity from the respective electric machine 106 to the aircraft electrical system 104. This electricity flow regulation may include: (a) turning-on the flow of electricity from the respective electric machine 106 to the aircraft electrical system 104 (e.g., electrically coupling the respective electric machine 106 to the aircraft electrical system 104); (b) turning-off the flow of electricity from the respective electric machine 106 to the aircraft electrical system 104 (e.g., electrically decoupling the respective electric machine 106 from the aircraft electrical system 104); (c) moderating the flow of electricity from the respective electric machine 106 to the aircraft electrical system 104. Here, the EM controller 108 operates as a generator controller.

The electric accessory system 102 includes one or more electric devices 130. The electric devices 130 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 130 of FIG. 2 may be configured as part of one or more sub-systems for the aircraft propulsion system 22 and its turbine engine 24. Examples of these sub-systems include, but are not limited to: a fuel system for delivering the fuel to the fuel injectors 100 (see FIG. 1); a lubrication system for delivering lubricant (e.g., oil) to one or more lubricated components (e.g., bearing(s), gear system(s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices.

Each electric device 130 is electrically coupled to the electrical distribution bus 126 of the aircraft electrical system 104 through one or more electric cables 132 (collectively schematically shown); e.g., high voltage electric cables, low voltage electric cables, power feeder cables, etc. Each electric device 130 may thereby receive a current of electricity from the aircraft electrical system 104 to power operation thereof.

The aircraft electrical system 104 includes the electrical distribution bus 126. This aircraft electrical system 104 may also include a power source 134 and/or a power storage 136. The electrical distribution bus 126 is electrically coupled to each electric machine 106 through the respective EM controller 108. The electrical distribution bus 126 is electrically coupled to each of the electric devices 130. The electrical distribution bus 126 is also electrically coupled to the power source 134 and the power storage 136, respectively schematically shown via lines 138 and 140. With this arrangement, the electrical distribution bus 126 provides an intermediate connection between the various electrical aircraft propulsion system members 106A (via 108A), 106B (via 108B), 130, 134 and/or 136. The power source 134 may be an electric generator powered by the turbine engine 24 or an electric generator powered by another aircraft powerplant; e.g., an engine of a companion aircraft propulsion system, an engine of an auxiliary power unit (APU), a fuel cell system, etc. The power storage 136 is configured to receive electricity from the electrical distribution bus 126 for storage. The power storage 136 is also configured to provide the stored electricity to the electrical distribution bus 126. The power storage 136, for example, may be configured as or otherwise include one or more electricity storage devices; e.g., batteries, super capacitors, etc. With the foregoing aircraft electrical system arrangement, the electrical current provided to one, some or all of the electric devices 130 may be received, through the electrical distribution bus 126, from any one, some or all of the electrical aircraft propulsion system members 106A, 106B, 134 and/or 136. It is also contemplated the electrical current provided to one of the electric machines 106 may be received from another one of the electric machines 106 through the aircraft electrical system 104 and its electrical distribution bus 126.

To accommodate the relatively high power requirements associated with the electric machines 106, each electric cable 124 may be sized with a relatively low gauge. Such low gauge electric cables 124 are relatively heavy and may require structural support for running relatively long cable lengths. The electric machine system 34 of FIG. 2 is therefore provided with a cable conduit 142 (schematically shown) for supporting, protecting and/or shielding the electric cables 124 as those electric cables 124 extend longitudinally between the electric machines 106 and the EM controllers 108.

Figure 3:
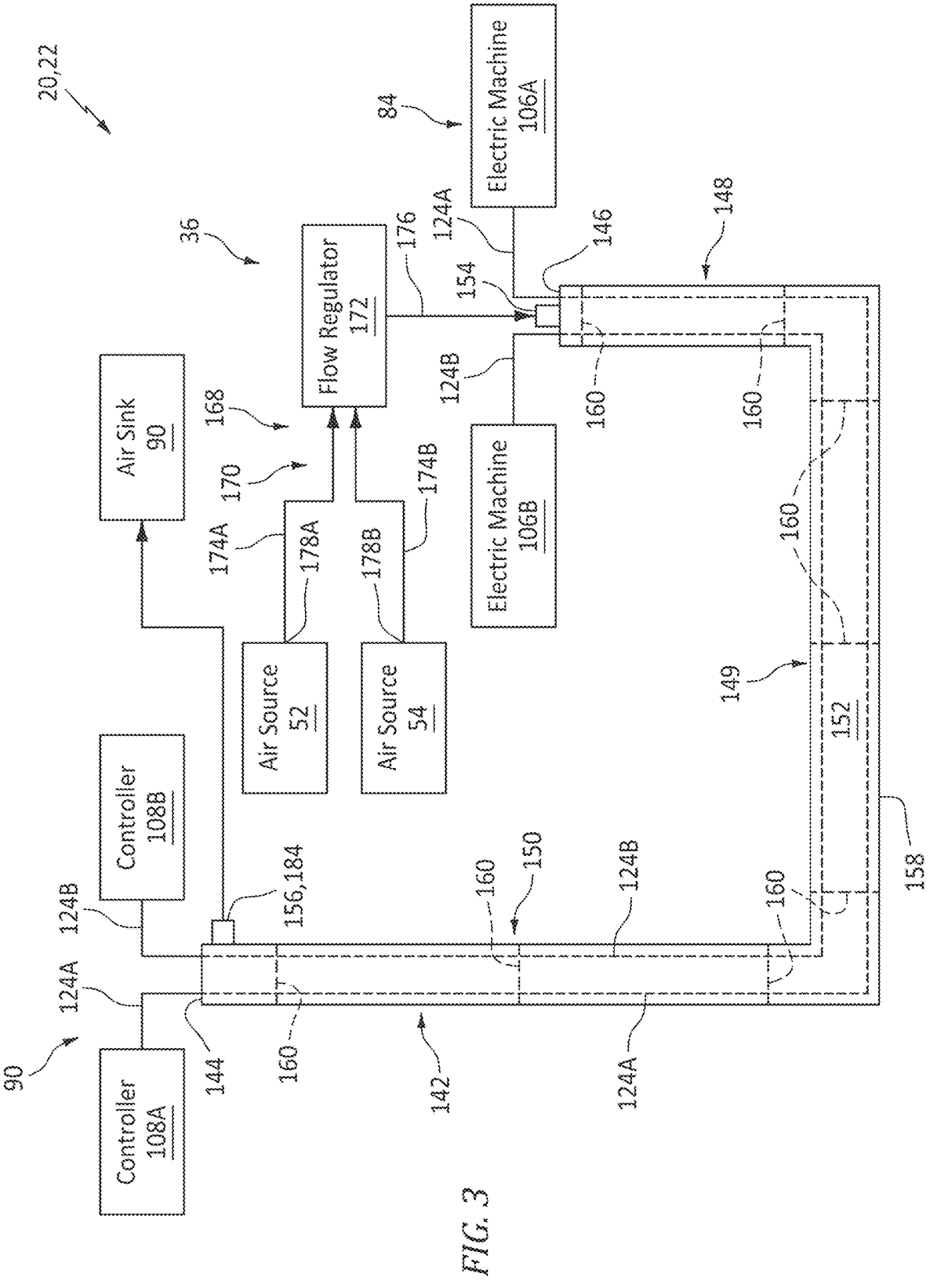
FIG. 3 is a schematic illustration of a portion of the aircraft propulsion system at an air system.
Figure 4:
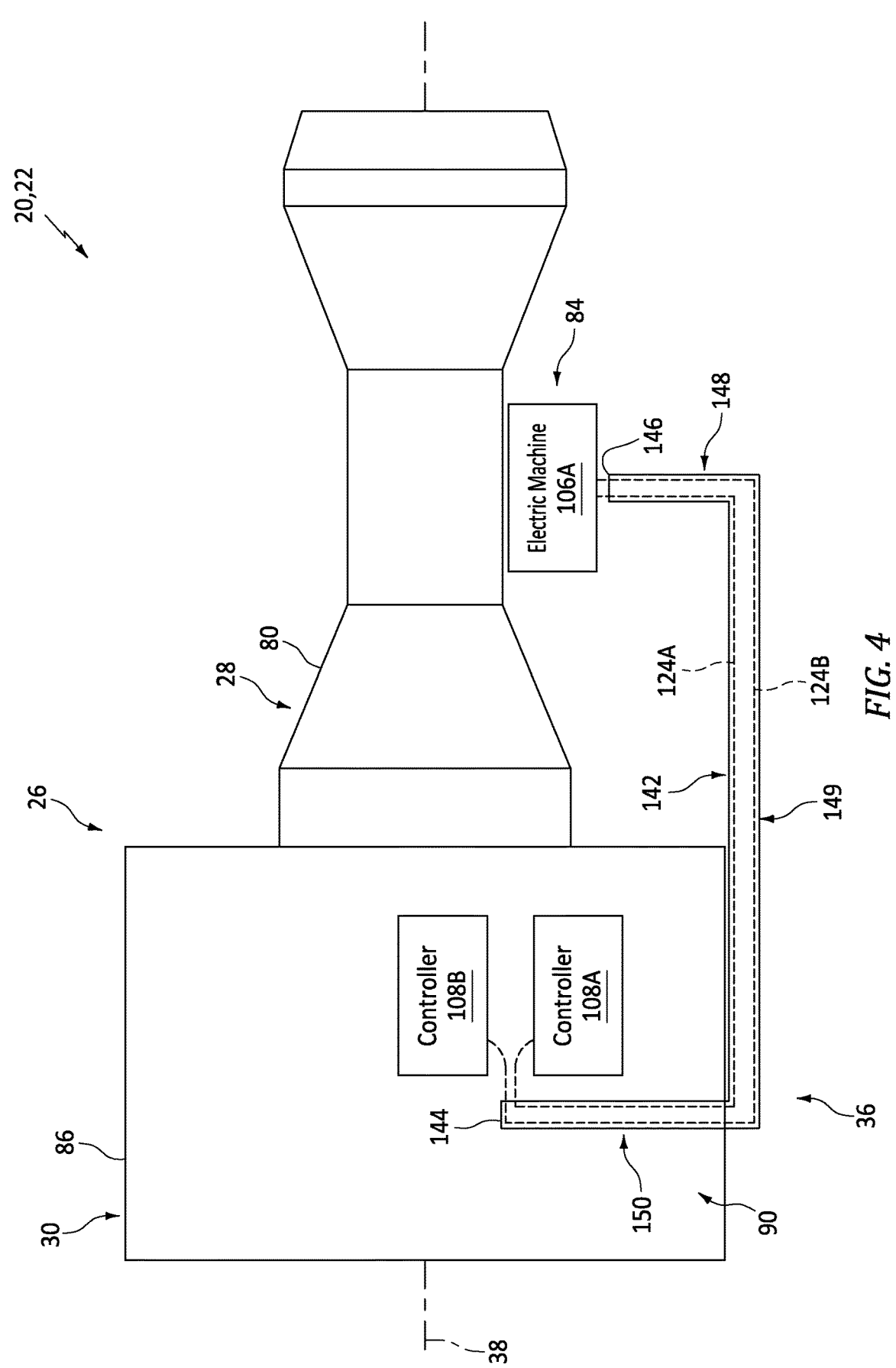
FIG. 4 is a partial side illustration of the electric machine system and the air system arranged with a propulsion system housing.
Figure 5:
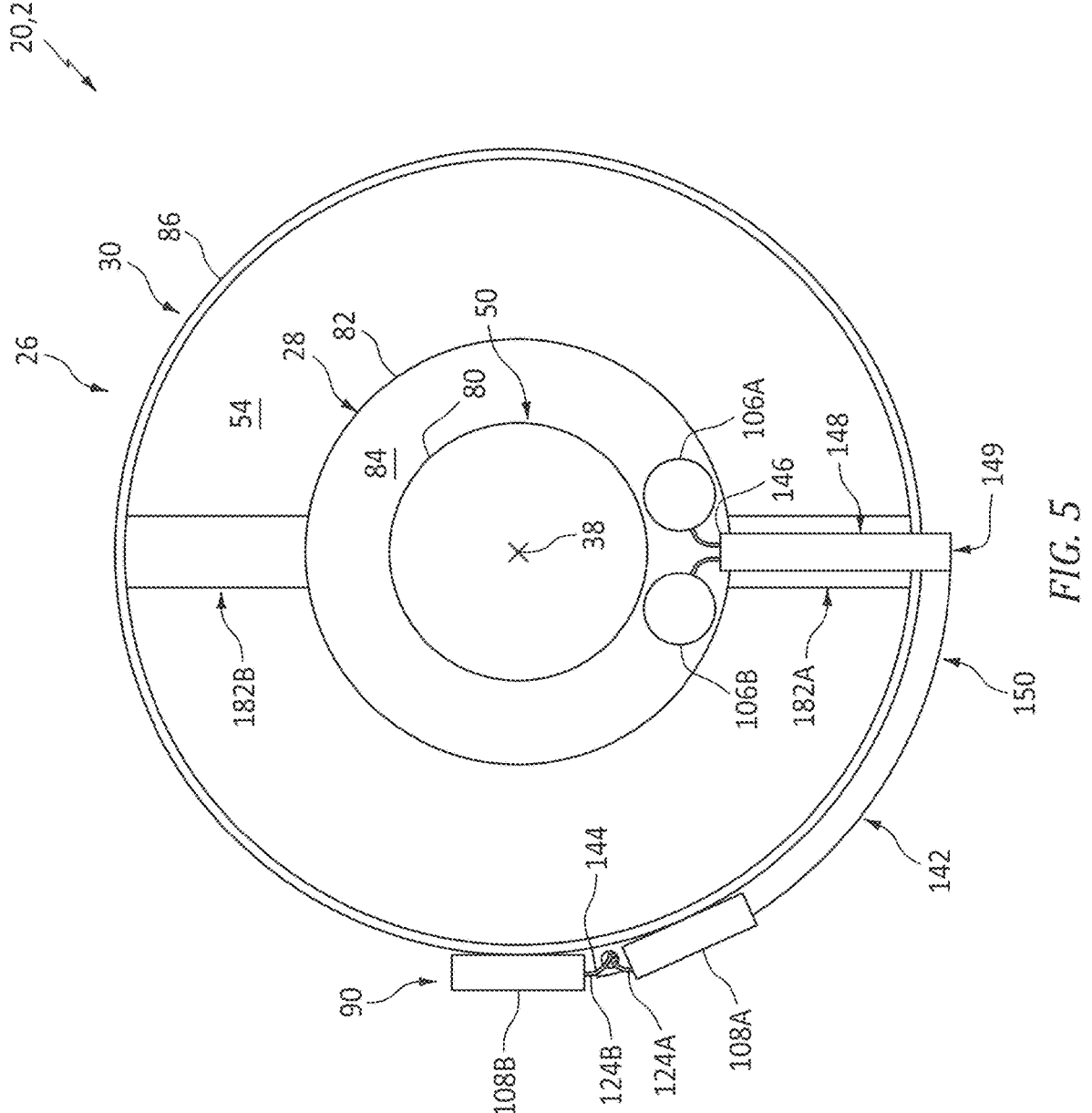
FIG. 5 is a partial end view illustration of the electric machine system and the air system arranged with the propulsion system housing.

Referring to FIG. 3, the cable conduit 142 extends longitudinally along a centerline of the cable conduit 142 from a first end 144 of the cable conduit 142 to a second end 146 of the cable conduit 142. Referring to FIGS. 4 and 5, the conduit first end 144 may be an outer and/or forward end of the cable conduit 142. This conduit first end 144 may be disposed next to and/or otherwise proximate the first EM controller 108A and/or the second EM controller 108B. The conduit first end 144 of FIGS. 4 and 5, for example, is disposed at (e.g., in, adjacent or proximate) an inter-controller gap between the first EM controller 108A and the second EM controller 108B. Here, each EM controller 108 is disposed within the outer housing compartment 90 (see also FIG. 1) and may be mounted (e.g., directly or indirectly) to the outer case 86. The conduit second end 146 may be an inner and/or aft end of the cable conduit 142. This conduit second end 146 may be disposed next to and/or otherwise proximate the first electric machine 106A and/or the second electric machine 106B. The conduit second end 146 of FIG. 5, for example, is disposed at an inter-machine gap between the first electric machine 106A and the second electric machine 106B. Here, each electric machine 106 is disposed within the inner housing compartment 84 (see also FIG. 1) and may be mounted (e.g., directly or indirectly) to the inner case 80.

The cable conduit 142 of FIGS. 4 and 5 and its conduit centerline may follow a tortuous (e.g., bending and/or otherwise non-straight) trajectory from the conduit first end 144 to the conduit second end 146. The cable conduit 142 of FIGS. 4 and 5, for example, includes one or more conduit segments such as a radial conduit segment 148, an axial conduit segment 149 and a circumferential conduit segment 150. The radial conduit segment 148 of FIG. 4 projects radially outward (e.g., away from the propulsion system axis 38) from the conduit second end 146 and meets the axial conduit segment 149 at a corner; e.g., a relatively tight radiused bend in the cable conduit 142 at an intersection between the radial conduit segment 148 and the axial conduit segment 149. Referring to FIG. 5, this radial conduit segment 148 may be circumferentially aligned with and projects radially through an interior of a vane structure such as a (e.g., lower) bifurcation structure 182A that extends radially across the bypass flowpath 54. Referring to FIG. 4, the axial conduit segment 149 projects axially along the propulsion system axis 38 between the radial conduit segment 148 and the circumferential conduit segment 150. The axial conduit segment 149 meets the circumferential conduit segment 150 at a corner; e.g., a relatively tight radiused bend in the cable conduit 142 at an intersection between the axial conduit segment 149 and the circumferential conduit segment 150. An aft portion of the axial conduit segment 149 is radially spaced outward from and axially overlaps (e.g., extends axially along) the inner housing structure 28 and its inner case 80. A forward portion of the axial conduit segment 149 is radially outboard of and axially overlaps the outer case 86. Referring to FIGS. 4 and 5, the circumferential conduit segment 150 projects circumferentially about the propulsion system axis 38 along the outer case 86 from the conduit first end 144 and meets the axial conduit segment 149 at a corner; e.g., a relatively tight radiused bend in the cable conduit 142 at an intersection between the circumferential conduit segment 150 and the axial conduit segment

Figure 7:
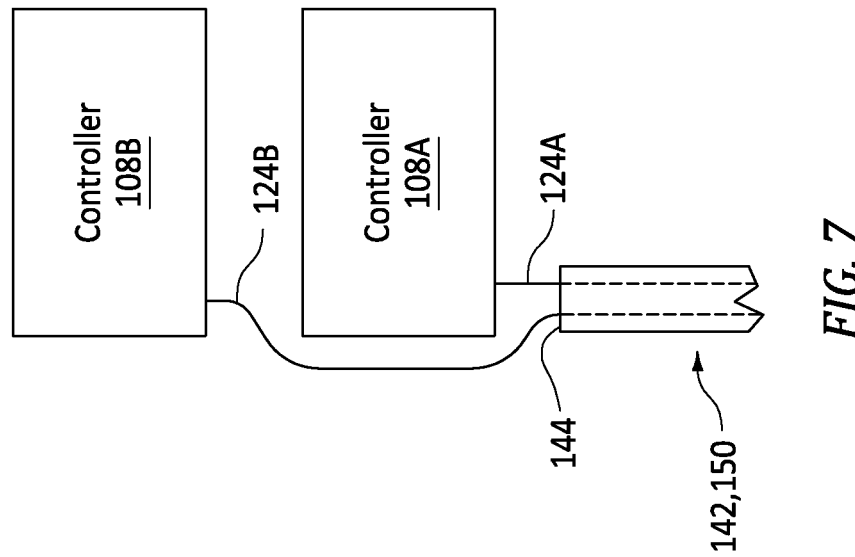
FIG. 7 is a schematic illustration of a portion of the aircraft propulsion system at an end of the cable conduit next to the set of electric machine controllers.
Figure 6:
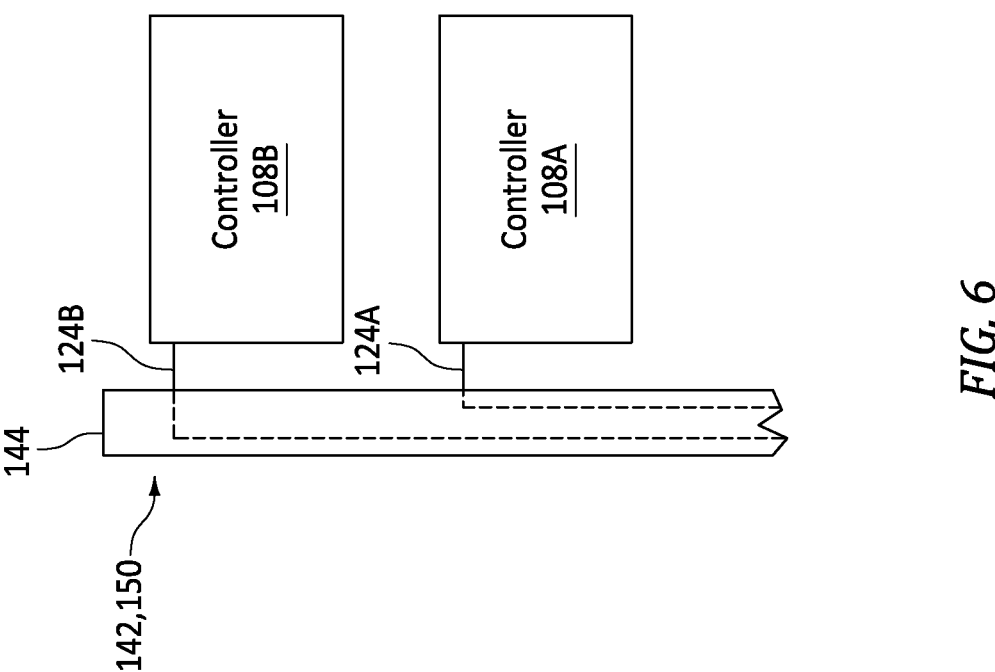
FIG. 6 is a schematic illustration of a portion of the aircraft propulsion system at an end of a cable conduit along a set of electric machine controllers.

149. An end portion of the circumferential conduit segment 150 is axially next to and circumferentially overlaps one of the EM controllers 108; e.g., the first EM controller 108A of FIG. 4. The present disclosure, however, is not limited to such an exemplary cable conduit arrangement. For example, referring to FIG. 6, the circumferential conduit segment 150 may alternatively circumferentially overlap each of the EM controllers 108. In another example, referring to FIG. 7, the conduit first end 144 may be disposed circumferentially next to one of the EM controllers 108, where this circumferential conduit segment 150 may not circumferentially overlap either of the EM controllers 108. Moreover, it is contemplated one or more of the foregoing conduit segments 148-150 may be omitted, replaced by one or more other conduit segments and/or one or more other conduit segments may be included in addition to the foregoing conduit segments 148-150.

Referring to FIG. 3, the cable conduit 142 may be a tubular structure with an internal bore 152; e.g., an internal passage. This conduit bore 152 of FIG. 3 extends longitudinally along the conduit centerline within the cable conduit 142 from an opening 154 (schematically shown) at the conduit first end 144 to an opening 156 (schematically shown) at the conduit second end 146. With this arrangement, each of the electric cables 124 may extend longitudinally within the cable conduit 142 and through its conduit bore 152 between the respective EM controller 108 and the respective electric machine 106. Segments of the electric cables 124 within the cable conduit 142 may thereby be supported by a tubular sidewall 158 of the cable conduit 142 as well as sheathed by the conduit sidewall 158.

Figure 8:
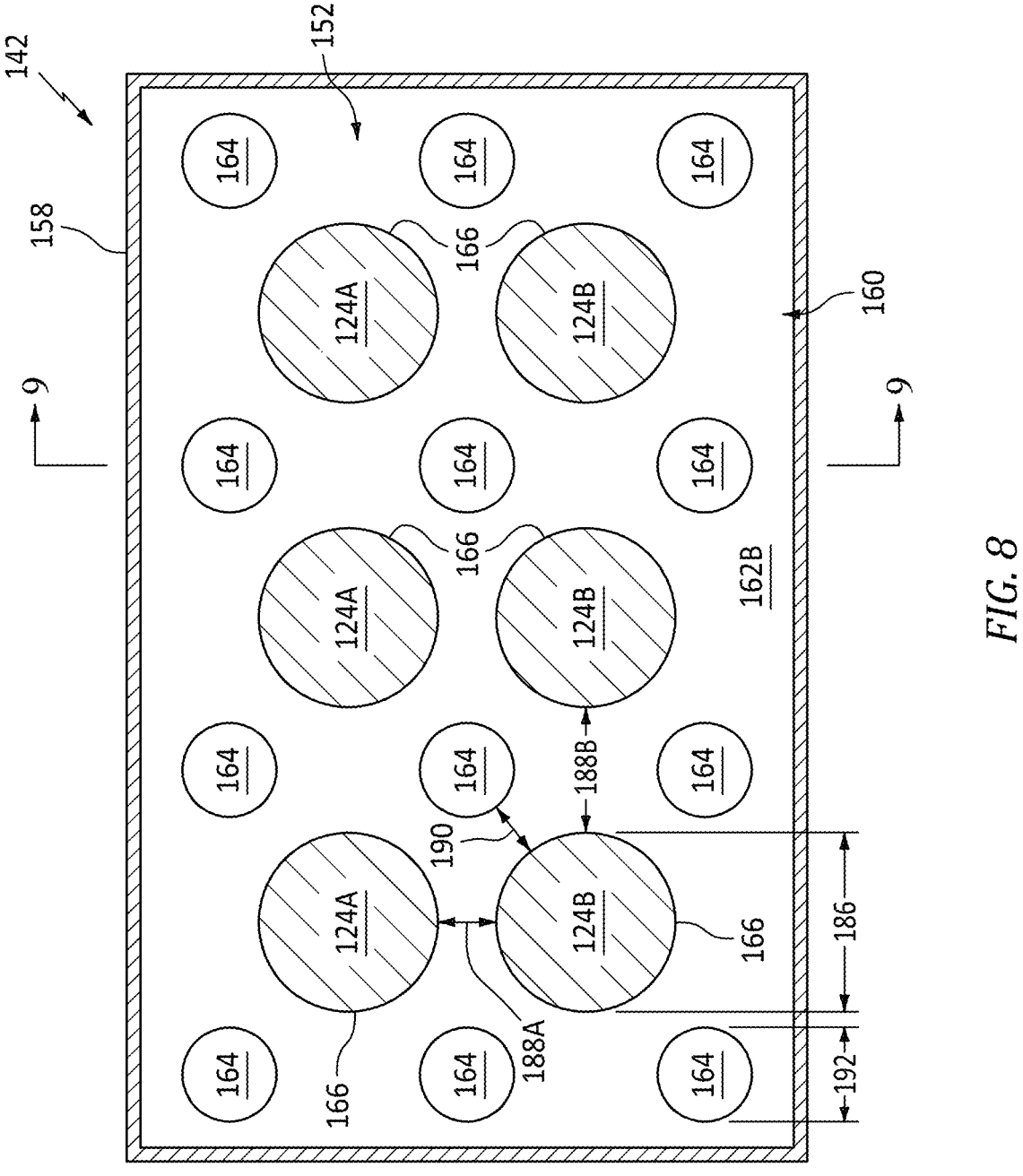
FIG. 8 is a cross-sectional illustration of the cable conduit supporting a set of electric cables.
Figure 9:
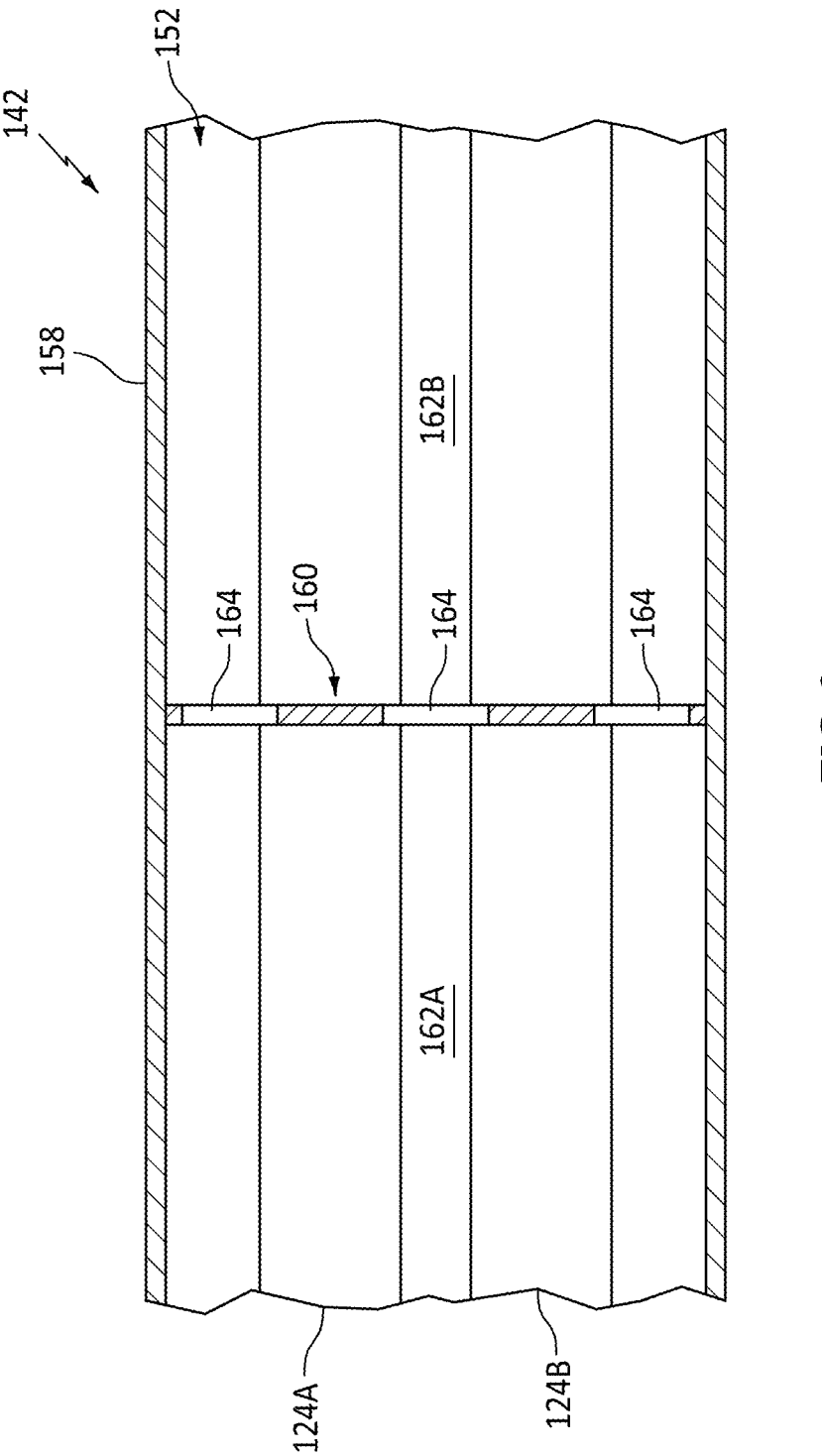
FIG. 9 is a sectional illustration of the assembly of FIG. 8 taken along line 9-9 in FIG. 8.

Each electric cable 124 may be mounted, located and/or otherwise supported within the conduit bore 152 by one or more support structures 160. These support structures 160 are disposed within the conduit bore 152. The support structures 160 are distributed and spaced apart longitudinally along the conduit centerline. Referring to FIG. 8, each support structure 160 may be configured as a perforated bulkhead. The support structure 160 of FIG. 8, for example, extends laterally in a first direction (e.g., horizontally in FIG. 8) across the conduit bore 152 between a first set of opposing sections of the conduit sidewall 158. The support structure 160 of FIG. 8 also extends laterally in a second direction (e.g., vertically in FIG. 8) across the conduit bore 152 between a second set of opposing sections of the conduit sidewall 158. Referring to FIG. 9, each support structure 160 may thereby spatially separate one section 162A of the conduit bore 152 from another section 162B of the conduit bore 152. These conduit bore sections 162A and 162B (generally referred to as "162"), however, are fluidly coupled together by one or more airflow ports 164 (e.g., open through-holes) as shown in FIG. 8. The support structure 160 of FIG. 8 also includes one or more cable apertures 166, where each cable aperture 166 receives a respective one of the electric cables 124. Here, each electric cable 124 is seated in and projects longitudinally through the respective cable aperture 166. The cable apertures 166 and the airflow ports 164 may be strategically located along the respective support structure 160 to (e.g., substantially uniformly) space the electric cable 124 within the conduit bore 152 while facilitating substantially uniform airflow along the electric cable 124 and longitudinally across the respective support structure 160. The present disclosure, however, is not limited to such an exemplary support structure arrangement. Moreover, while each cable aperture 166 is described above as receiving a single one of the electric cables 124, it is contemplated one or more of the cable apertures 166 may alternatively be sized to receive a bundle of the electric cables 124.

Referring to FIG. 3, the air system 36 is configured to ventilate the cable conduit 142 and/or cool one or more or all of the electric cables 124 extending within the cable conduit 142 and its conduit bore 152. The air system 36 of FIG. 3, for example, includes one or more air sources, at least (or only) one air sink and an air circuit 168. For ease of description, the air sources are described below as the core flowpath 52 and the bypass flowpath 54 (see also FIG. 1) and the air sink is described below as the outer housing compartment 90 (see FIG. 1). The present disclosure, however, is not limited to such an exemplary arrangement. For example, one or the core flowpath 52 or the bypass flowpath 54 may be configured as the sole (e.g., only) air source for the air system 36. In another example, the external environment 92 (see FIG. 1) may be configured as an air source for the air system 36, which may be in addition to or as an alternatively to the core flowpath 52 and/or the bypass flowpath 54. In another example, the bypass flowpath 54 may be configured as the air sink. In still another example, the external environment 92 (see FIG. 1) may be configured as the air sink.

The air circuit 168 of FIG. 3 is configured to direct pressurized air (e.g., compressed air, forced induction air, etc.) received from the core flowpath 52 and/or the bypass flowpath 54 (the air source(s)) through the cable conduit 142 and its conduit bore 152 to the outer housing compartment 90 (the air sink). This air circuit 168 includes a circuit path 170 and a flow regulator 172.

The circuit path 170 of FIG. 3 extends through the flow regulator 172 and the cable conduit 142 between (a) the core flowpath 52 and/or the bypass flowpath 54 and (b) the outer housing compartment 90. The circuit path 170 of FIG. 3, for example, includes one or more upstream supply legs 174A and 174B (generally referred to as "174") and a downstream flow leg 176.

The first supply leg 174A projects longitudinally from an airflow inlet 178A into the air circuit 168 and its circuit path 170 to the flow regulator 172 at a junction with the flow leg 176. Referring to FIG. 1, the first circuit inlet 178A may be disposed along the core flowpath 52 at a location upstream of the combustor section 46 and its combustor 98. More particularly, the first circuit inlet 178A may be disposed along the core flowpath 52 in the compressor section 45. The first circuit inlet 178A of FIG. 1, for example, is disposed along the core flowpath 52 in the LPC section 45A. This first circuit inlet 178A may be disposed along a downstream half (½), third (⅓) or quarter (¼) of the LPC rotor 65. The first circuit inlet 178A of FIG. 1, for example, is disposed at (or about) a downstream end 180 of the LPC rotor 65. The first circuit inlet 178A may be configured as or otherwise include a bleed port (or multiple bleed ports) and/or a scoop (or multiple scoops) in and/or along a radial outer peripheral boundary of the core flowpath 52 longitudinally overlapping the LPC rotor 65. The present disclosure, however, is not limited to such an exemplary arrangement. For example, the first circuit inlet 178A may be disposed longitudinally along the core flowpath 52 between (a) the LPC section 45A and/or its LPC rotor 65 and (b) the HPC section 45B and/or its HPC rotor 66.

Referring to FIG. 3, the second supply leg 174B projects longitudinally from an airflow inlet 178B into the air circuit 168 and its circuit path 170 to the flow regulator 172 at the junction with the flow leg 176. Referring to FIG. 1, the second circuit inlet 178B may be configured as or otherwise include a bleed port (or multiple bleed ports) and/or a scoop (or multiple scoops) in and/or along the inner peripheral boundary of the bypass flowpath 54. The second circuit inlet 178B of FIG. 1 is disposed at a location downstream of the guide vane structure 32. The present disclosure, however, is not limited to such an exemplary arrangement. For example, the second circuit inlet 178B may alternatively be disposed in a vane structure such as a (e.g., upper) bifurcation structure 182B that extends radially across the bypass flowpath 54 (or the other bifurcation structure 182A of FIG. 5). In another example, the second circuit inlet 178B may be disposed at a location aligned with or upstream of the guide vane structure 32.

Referring to FIG. 3, the flow leg 176 projects longitudinally from the flow regulator 172 at the junction with the supply legs 174, through the cable conduit 142 and its conduit bore 152, to an airflow outlet 184 from the air circuit 168 and its circuit path 170. This circuit outlet 184 fluidly couples the air circuit 168, the circuit path 170 and its flow leg 176 to the air sink (e.g., the outer housing compartment 90 or another air sink). Here, the conduit bore 152 forms a longitudinal section of the circuit path 170 and its flow leg 176.

The flow regulator 172 is configured to selectively divert air from the first supply leg 174A and/or the second supply leg 174B into the flow leg 176. The flow regulator 172 of FIG. 3, for example, is configured to fluidly couple the first supply leg 174A and/or the second supply leg 174B to the flow leg 176. The flow regulator 172, for example, may be configured as or otherwise include a flow diverter, a switching valve or a switching valve system. During a first mode of operation (e.g., during aircraft ground idle operation), the flow regulator 172 may fluidly couple the first supply leg 174A to the flow leg 176. Here, the flow regulator 172 may also fluidly decouple the second supply leg 174B from the flow leg 176. By contrast, during a second mode of operation (e.g., during aircraft cruise), the flow regulator 172 may fluidly couple the second supply leg 174B to the flow leg 176. Here, the flow regulator 172 may also fluidly decouple the first supply leg 174A from the flow leg 176. Of course, it is also contemplated the flow regulator 172 may operate in a third mode of operation where the flow regulator 172 fluidly couples both the first supply leg 174A and the second supply leg 174B to the flow leg 176 according to a controlled split ratio (e.g., 25:75, 50:50 or 75:25) between the first supply leg 174A and the second supply leg 174B.

During operation of the air system 36 of FIG. 3, the air circuit 168 receives pressurized air from the core flowpath 52 and/or the bypass flowpath 54. This air is directed through the respective supply leg(s) 174, through the flow regulator 172, and into the flow leg 176. Within the cable conduit 142 and its conduit bore 152, the pressurized air flows in between (see FIGS. 8 and 9) and longitudinally along the electric cables 124 within the cable conduit 142 and its conduit bore 152. The pressurized air may thereby convectively cool the electric cables 124 within the cable conduit 142 and its conduit bore 152 before being exhausted through the circuit outlet 184 into the outer housing compartment 90. The air system 36 may thereby ventilate the conduit bore 152 and cool the electric cables 124 within the cable conduit 142 and its conduit bore 152.

Referring to FIG. 8, each electric cable 124 (or bundle of the electric cables) and its respective cable aperture 166 has a lateral width 186; e.g., a diameter. A lateral distance 188A, 188B between (a) each electric cable 124 (or bundle of the electric cables 124) and/or its respective cable aperture 166 and (b) a laterally neighboring electric cable 124 (or bundle of the electric cables 124) and/or its respective cable aperture 166 may be sized between twenty percent (20%) and one-hundred percent (100%) or two-hundred percent (200%) of the lateral width 186. A lateral distance 190 between (a) each electric cable 124 (or bundle of the electric cables 124) and/or its respective cable aperture 166 and (b) a laterally neighboring airflow port 164 may be sized between twenty percent (20%) and one-hundred percent (100%) of the lateral width 186. Here, a lateral width 192 (e.g., a diameter) of each airflow port 164 is less than the lateral width 186. The present disclosure, however, is not limited to such exemplary dimensional relationships as the dimensions may be adjusted to tune airflow through the conduit core.

In some embodiments, referring to FIG. 3, the cable conduit 142 may support and shield the electric cables 124A and 124B associated with both electric machines 106A and 106B and both EM controllers 108A and 108B. Here too, the cable conduit 142 is dedicated to the electric cables 124; e.g., no other electric cables run through the cable conduit 142. In other embodiments, however, one or more additional electric cables may also be run through the cable conduit 142 along side the electric cables 124. In still other embodiments, it is contemplated each set of electric cables 124A, 124B may be run through a separate cable conduit 142, which may or may not be dedicated to that set of electric cables 124.

Figure 10:
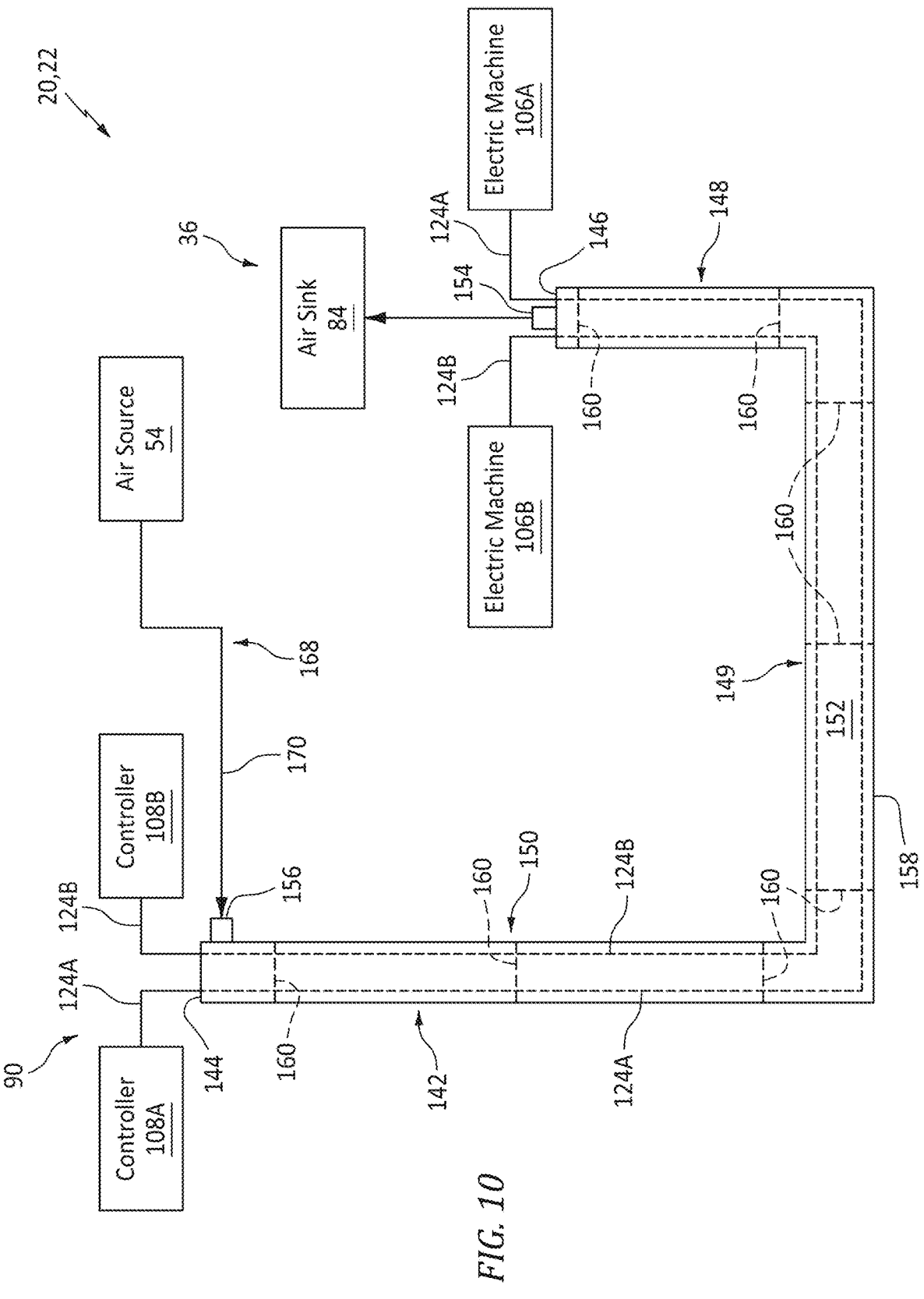
FIG. 10 is a schematic illustration of a portion of the aircraft propulsion system at the air system with another flow direction.

In some embodiments, referring to FIG. 3, the flow of air through the cable conduit 142 may travel from or about the conduit second end 146 to or about the conduit first end 144. The present disclosure, however, is not limited to such an exemplary flow direction. For example, referring to FIG. 10, the flow of air through the cable conduit 142 may alternatively travel from or about the conduit first end 144 to or about the conduit second end 146.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft powerplant, comprising:
a compressor section;
a combustor section;
a turbine section;
an inner case, the inner case radially outboard of at least one of the compressor section, the combustor section and the turbine section;
an electric machine located radially outboard of and mounted with the inner case;
an electric machine controller configured to control operation of the electric machine;
an electric cable electrically coupling the electric machine controller to the electric machine;
a conduit extending longitudinally from a first end of the conduit to a second end of the conduit, the electric cable extending longitudinally through a bore of the conduit; and an air circuit configured to cool the electric cable within the conduit using a flow of air, the air circuit comprising the bore of the conduit.

2. The assembly of claim 1, further comprising:
a first air source;
the air circuit configured to direct the flow of air from the first air source into the bore of the conduit.

3. The assembly of claim 2, further comprising: a combustor and a core flowpath extending through the compressor section, the combustor section and the turbine section; the first air source comprising the core flowpath, and an inlet into the air circuit disposed along the core flowpath upstream of the combustor.

4. The assembly of claim 3, wherein the inlet into the air circuit is disposed along the core flowpath in the compressor section.

5. The assembly of claim 3, wherein the air circuit further comprises a flow regulator between the core flowpath and the bore of the conduit, and the flow regulator comprises, a valve or a valve system.

6. The assembly of claim 2, further comprising: a combustor; and a bypass flowpath bypassing the compressor section, the combustor section and the turbine section; the first air source comprising the bypass flowpath, and an inlet into the air circuit disposed along the bypass flowpath.

7. The assembly of claim 6, wherein the air circuit further comprises a flow regulator between the bypass flowpath and the bore of the conduit, and the flow regulator comprises a valve or a valve system.

8. The assembly of claim 2, further comprising:
a second air source;
the air circuit configured to direct the flow of air from the first air source into the bore of the conduit during a first mode; and
the air circuit configured to direct the flow of air from the second air source into the bore of the conduit during a second mode.

9. The assembly of claim 1, further comprising:
a support structure disposed within the bore of the conduit;
the support structure supporting the electric cable within the bore of the conduit.

10. The assembly of claim 1, further comprising:
a bulkhead disposed within and extending laterally across the bore of the conduit;
the bulkhead comprising a cable aperture and an airflow port;
the cable aperture and the airflow port each projecting longitudinally through the bulkhead; and
the electric cable seated in the cable aperture.

11. The assembly of claim 10, wherein
the airflow port is next to the cable aperture;
a distance between the cable aperture and the airflow port is between twenty percent and one hundred percent of a width of the cable aperture.

12. The assembly of claim 1, further comprising:
a second electric cable extending longitudinally through the bore of the conduit;
the second electric cable laterally spaced from the electric cable by an air gap within the bore of the conduit; and
a distance between the second electric cable and the electric cable across the air gap is between twenty percent and two hundred percent of a width of the electric cable.

13. The assembly of claim 1, further comprising a second electric cable extending longitudinally through the bore of the conduit, the second electric cable further electrically coupling the electric machine controller to the electric machine.

14. The assembly of claim 1, further comprising:

a second electric machine;

a second electric machine controller configured to control operation of the second electric machine; and a second electric cable electrically coupling the second electric machine controller to the second electric machine, the second electric cable extending longitudinally through the bore of the conduit.

15. The assembly of claim 1, further comprising:

a rotating structure comprising a bladed rotor;

the electric machine operatively coupled to the rotating structure; and the inner case radially outboard of the rotating structure.

16. The assembly of claim 1, further comprising an outer case spaced radially outboard from and extending circumferentially about the inner case, the electric machine controller mounted with the outer case.

17. The assembly of claim 1, further comprising:

a vane structure;

the conduit extending through an interior of the vane structure.

18. The assembly of claim 1, further comprising:

a housing structure comprising an internal compartment that is radially outboard of the inner case;

the electric machine controller disposed within the internal compartment; and the air circuit configured to direct the flow of air out of the conduit into the internal compartment.

19. An assembly for an aircraft powerplant, comprising:

a compressor section;

a combustor section;

a turbine section;

an engine case radially outboard of and housing the compressor section, the combustor section and the turbine section;

an electric device mounted with and radially outboard of the engine case, the electric device comprising an electric machine;

an electric cable electrically coupled to the electric device;

a conduit extending longitudinally from a first end of the conduit to a second end of the conduit, the electric cable extending longitudinally through a bore of the conduit to the electric device; and an air circuit comprising the bore of the conduit, the air circuit configured to selectively direct air received from a first air source and/or a second air source into the bore of the conduit to cool the electric cable within the conduit.

* * * * *